US009661578B2

(12) United States Patent
Gruet et al.

(10) Patent No.: US 9,661,578 B2
(45) Date of Patent: May 23, 2017

(54) METHOD FOR ESTABLISHING A STRATEGY FOR SAVING THE ENERGY OF MOBILE TERMINAL BATTERIES

(71) Applicant: AIRBUS DS SAS, Elancourt (FR)

(72) Inventors: Christophe Gruet, Montigny le Bretonneux (FR); Eric Georgeaux, Montigny le Bretonneux (FR); Hervé Gromat, Montigny le Bretonneux (FR); Xavier Pons Masbernat, Montigny le Bretonneux (FR); Lirida Naviner, Le Blanc Mesnil (FR)

(73) Assignee: AIRBUS DS SAS, Elancourt (FR)

( * ) Notice: Subject to any disclaimer, the term of this patent is extended or adjusted under 35 U.S.C. 154(b) by 0 days.

(21) Appl. No.: 14/653,892

(22) PCT Filed: Nov. 19, 2013

(86) PCT No.: PCT/EP2013/003489
§ 371 (c)(1),
(2) Date: Dec. 1, 2015

(87) PCT Pub. No.: WO2014/094953
PCT Pub. Date: Jun. 26, 2014

(65) Prior Publication Data
US 2016/0095066 A1    Mar. 31, 2016

(30) Foreign Application Priority Data

Dec. 21, 2012  (FR) ...................................... 12 03572

(51) Int. Cl.
*H04B 1/16*    (2006.01)
*H04W 52/02*   (2009.01)
*H04W 76/04*   (2009.01)

(52) U.S. Cl.
CPC ..... *H04W 52/0261* (2013.01); *H04W 76/046* (2013.01); *Y02B 60/50* (2013.01)

(58) Field of Classification Search
CPC .............................. H04W 48/12; H04W 4/06
(Continued)

(56) References Cited

U.S. PATENT DOCUMENTS

| 6,201,977 B1 * | 3/2001 | Cathey ................. H02J 7/0063 455/343.1 |
| 7,570,975 B2 * | 8/2009 | Oprescu-Surcobe H04W 52/0225 340/7.32 |

(Continued)

FOREIGN PATENT DOCUMENTS

| EP | 1 959 621 A1 | 8/2008 |
| EP | 1 991 025 A1 | 11/2008 |

OTHER PUBLICATIONS

International Preliminary Report on Patentability and the Written Opinion of the International Searching Authority as issued in International Patent Application No. PCT/EP2013/003489, dated Jun. 23, 2015.

(Continued)

*Primary Examiner* — Sonny Trinh
(74) *Attorney, Agent, or Firm* — Pillsbury Winthrop Shaw Pittman LLP

(57) ABSTRACT

A battery sharing method to increase the service life of the batteries of PMR terminals having important uses, such as the terminal of the head of a group such as the police, firefighters, or the like, is disclosed. The technique is based on the detection of neighboring networks and/or neighboring nodes. The detection is facilitated by reiterating a selection (or reselection) of cells and a handover (HO)/vertical handover (VHO) procedure, while relaying and coordinating transmission and reception. The aim of the techniques is to improve communications as well as the duration thereof, in (Continued)

order to enable improved management of the battery of each terminal and to broaden coverage in areas that are not served by a network.

9 Claims, 2 Drawing Sheets

(58) Field of Classification Search
USPC ....... 455/343.1, 343.2, 343.5, 573, 518, 519
See application file for complete search history.

(56) References Cited

U.S. PATENT DOCUMENTS

| | | | |
|---|---|---|---|
| 7,613,473 B2* | 11/2009 | Yi | H04W 76/027 455/39 |
| 2013/0231120 A1* | 9/2013 | Koc | H04W 52/04 455/450 |

OTHER PUBLICATIONS

Jia, Hui-ling et al., "A Power Threshold Based Policy for Vertical Handoff in Heterogeneous Networks," International Conference on Wireless Communications, Network and Mobile Computing, 2005, vol. 2, pp. 1052-1055.
International Search Report as issued in International Patent Application No. PCT/EP2013/003489, dated Feb. 10, 2014.

* cited by examiner

METHOD FOR ESTABLISHING A STRATEGY FOR SAVING THE ENERGY OF MOBILE TERMINAL BATTERIES

CROSS-REFERENCE TO RELATED APPLICATIONS

This is the U.S. National Stage of PCT/EP2013/003489, filed Nov. 19, 2013, which in turn claims priority to French Patent Application No. 12 03572, filed Dec. 21, 2012, the entire contents of all applications are incorporated herein by reference in their entireties.

FIELD OF THE INVENTION

The present invention relates to a method for establishing a strategy for saving the energy of mobile terminal batteries. The invention is particularly advantageously applicable to private mobile radio or professional mobile radio (PMR) digital mobile systems. The object of the invention has a further interest for what wireless terminals, known as mobile, intended to very high rates, such as wide band technologies based on LTE (Long Term Evolution), or 4G ($4^{th}$ generation of cellular network).

STATE OF THE ART AND TECHNICAL PROBLEMS ENCOUNTERED

In the field of private mobile radio communication digital systems, called PMR hereinafter, there is a need to develop PMR networks based on narrowband technologies, and from the legacy generation, into PMR networks based on broadband technologies, or even very high speed broadband. By narrowband-based PMR network, it is meant a network of the TETRA, or TETRAPOL, or P25 technology. By broadband-based PMR network, it is meant a network of the IP-WAN technology. By IP-WAN networks, it is meant networks based on the WIFI (Wireless Fidelity), and/or WIMAX (Worldwide Interoperability for Microwave Access), and/or 2G ($2^{nd}$ generation of cellular network), and/or 3G ($3^{rd}$ generation of cellular network), and/or LTE (Long term Evolution), 4G ($4^{th}$ Generation) technologies and/or future technologies.

This evolution is intended to enable new services based on IP (Internet Protocol) to be integrated, but also to continue to support services of PMR networks from prior generations, such as radio, as well as all the interfaces.

However, within the scope of the evolution of such a PMR network into very high speed mobile broadband, such as LTE, or 4G, the most critical problem encountered is the low service life of the batteries of the terminals using the aforementioned technologies.

There is thus a need to determine a technique or a set of techniques enabling the energy from each battery of the terminal to be saved.

DISCLOSURE OF THE INVENTION

The present invention aims at solving all the drawbacks of the state of the art. For this, the invention provides a method for establishing a strategy for saving the energy of mobile terminal batteries, according to any of the characteristics of claim 1 and the following claims, allowing a better energy storage based on the battery level of each terminal, in order to reduce the energy consumption of the entire LTE- or 4G-type PMR telecommunication system.

The object of the invention is based on the concept of battery sharing, which aims at increasing the service life of batteries for these PMR terminals which have important uses, such as for example the terminal of the head of a group such as the police, firefighters, or the like. This technique is based on the detection of neighbouring networks and/or neighbouring nodes. This detection is facilitated by reiterating a selection (or reselection) of cells and a Handover (HO)/Vertical Handover (VHO) procedure, while relaying and coordinating transmission and reception. The aim of these techniques according to the invention is to improve communications as well as their durations, in order on the one hand, to enable improved management of the battery of each terminal and, on the other hand, to broaden coverage in areas that are not served by a network (also called a "black" area in the trade jargon).

BRIEF DESCRIPTION OF THE FIGURES

The invention will be better understood upon reading the following description and upon examining the accompanying figures. These are given only by way of illustrating, but in no way limiting, purposes for the invention. The figures show.

DESCRIPTION OF THE INVENTION

Figure 1:
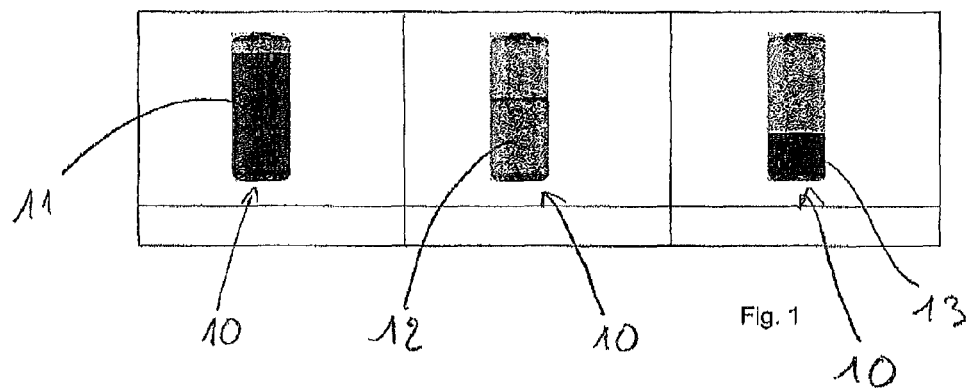
FIGS. 1-2: schematic representations of a terminal battery, according to the state of the art.
Figure 2:
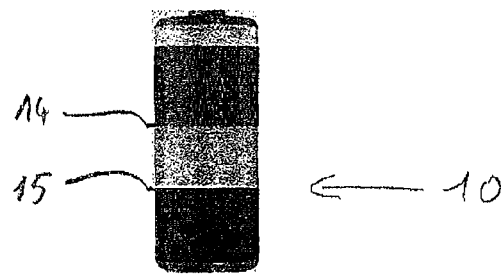
Figure 3:
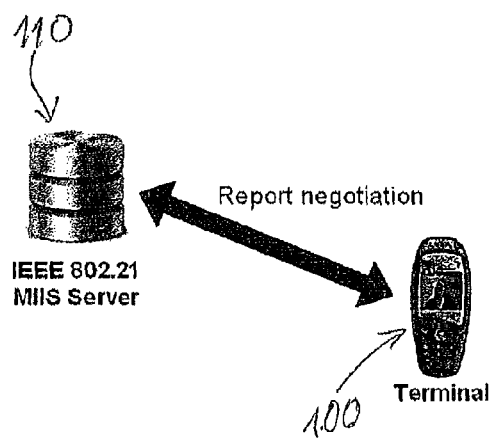
FIG. 3: a schematic representation of the system, according to one embodiment of the invention, enabling the method according to FIG. 4 to be implemented.
Figure 3:
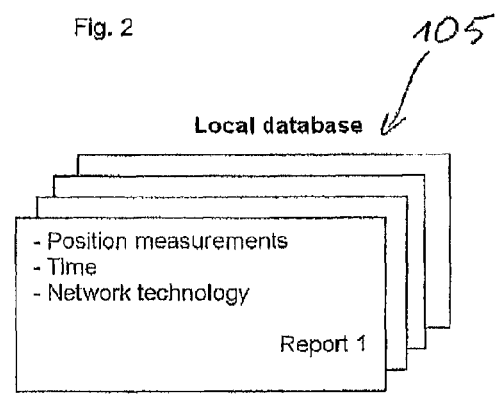
Figure 4:
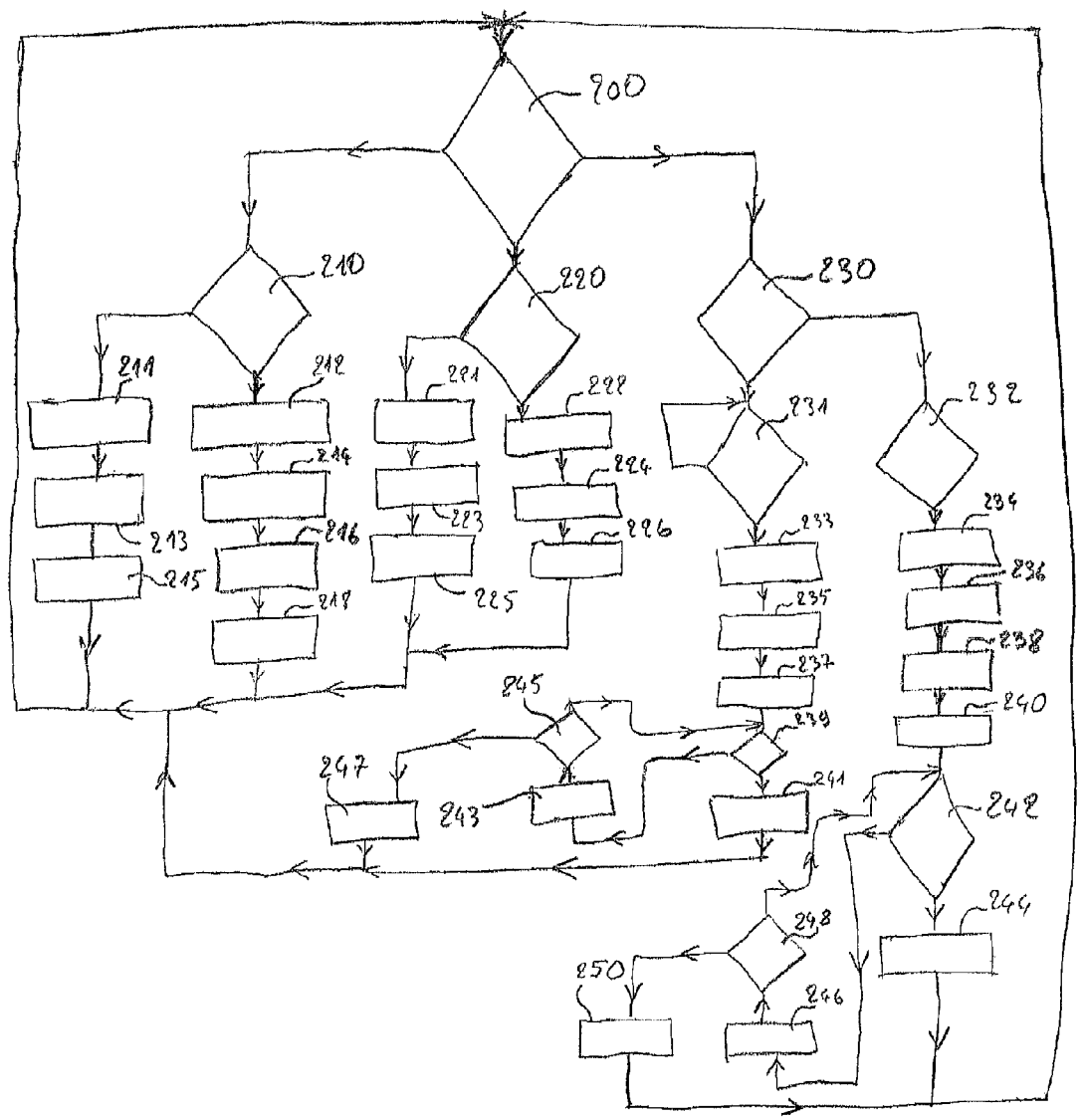
FIG. 4: a functional diagram of the operation of the method, according to one embodiment of the invention.

It is now noticed that the figures are not drawn to the scale.

The following embodiments are examples. Although the description refers to one or more embodiments, this does not necessarily mean that each reference relates to the same embodiment, or that the characteristics only apply to a single embodiment. Simple characteristics of different embodiments can also be combined to provide other embodiments.

The invention that will be hereinafter described has the purpose to enable a detection of networks as well as neighbouring nodes, while simultaneously enabling coordinating transmission and reception, depending on the battery level of a terminal. Thereby, the invention provides assistance in improving energy efficiency, as well as in improving the service life of batteries. More particularly, the improvements provided by the invention relate to batteries intended to 4G ($4^{th}$ generation of cellular network), or LTE (Long term Evolution) technology terminals, said terminals being provided, in a preferred embodiment, for a so-called PMR (Private/Professional Mobile Radio) use.

The overall purpose of the invention is to allow a much more efficient management of the battery level of each terminal, for said battery not to be too quickly depleted, during an intervention of a user group (police gendarmerie, special unit, firefighters, or any other intervention unit entitled to use such a mobile terminal) on a geographic region, for example, and to come to be short of energy during said intervention or during next uses of said terminal.

Consequently, the invention allows management of the battery 10 such that a terminal having a high level 11 of the battery 10 is in charge of the activities or tasks that are the most energy consuming, whereas a terminal having a low level 13 of the battery 10 is mainly in charge only of its operation and attempts to carry out some essential activities.

The present invention relates to a method for detecting neighbouring networks located around a specific terminal. This embodiment according to the invention is based on IEEE 802.21 standard, and enables a terminal to be able either to reselect a new cell, or to carry out a Handover (HO), or to carry out a Vertical Handover (or VHO). By the term Handover, it is meant the fact that in mobile radio-communication cellular systems, it is possible to switch transmission means used by a communication without interrupting the same. This term Handover or HO will be used in the rest of the description referring to this definition.

Likewise, by the term Vertical Handover, it is meant the possibility for a mobile radio-communication cellular system, to switch transmission means used by a communication, to an access to the support of another cellular network infrastructure, without interrupting the already established communication. The term Vertical Handover or VHO will be used in the rest of the description referring to this definition.

IEEE 802.21 standard contemplates interconnections with IEEE 802 systems, and it also contemplates interconnections between IEEE 802 systems and non-IEEE 802 standardized systems.

This IEEE 802.21 standard enables users and mobile operators to take fully advantage of heterogeneous networks. By heterogeneous networks, it is meant networks of any possible radio technologies as WLAN (WIFI), WPAN (Bluetooth), WMAN (WiMAX, 3GPP, and 3GPP2). This so-called IEEE 802 standard also provides a structure efficient for detecting networks and cleverly facilitates the VHO, based on the states of current network connections and the capacities thereof. IEEE 802.21 standard defines services allowing a Media Independent Handover or MIH, which interact with the highest layer of the stacked layers of the protocol, to facilitate a homogenized Handover between the different wireless networks located in a similar area. One of these services is the Media Independent Information Services (MIIS), which service provides a structure and a corresponding mechanism, to detect the existence of networks and obtain information about the potential candidate detected networks, around the network already in service, for the purpose of more easily obtaining a Vertical Handover. The MIIS server accommodates nearly all the static information about the candidate access networks. The dynamic change of the attributes and the state of the parameters have to be obtained by directly requiring an access to the respective networks.

Within the scope of this invention, three types of terminals are distinguished. First, the terminals having a high level 11 of battery 10, then the terminals having a medium level 12 of battery 10, and finally the terminals having a low level 13 of battery 10. This distinction is carried out by establishing two thresholds, including a high threshold 14 and a low threshold 15. However, for a better understanding, the terminal will be referenced as 100 in the rest of the description.

The operating method according to one embodiment of the invention will now be described and implemented by the controller (not represented) of each mobile terminal 100.

Such a controller is known to those skilled in the art and is not an object of our invention. A further description of this controller is thus useless. However, the actions undertaken by the controller of each terminal 100 are commanded by a microprocessor (not represented). This microprocessor produces, in response to the instruction codes recorded in a program memory (not represented), commands intended to implement the method of the invention, as well as the different members associated with said controller. To that end, the program memory includes several program areas, corresponding to a series of steps respectively.

In a step 200, the controller of the terminal 100 determines the state of its battery 100. If the state of the battery 10 indicates that the same is charged at a high level, then the controller executes a step 210. If the state of the battery 10 indicates that the same is charged at a medium level, then the controller executes a step 220. If the state of the battery 10 indicates that the same is charged at a low level, then the controller executes a step 230. The state of the battery can only be included in one of these three steps.

In a step 210, when the battery 10 is fully charged or at a high level 11, in other words, when the terminal 100 has a battery 10 having a level higher than the high threshold 14, then the controller determines the operational mode of the RRC (Radio Resource Control) layer (not represented) of the terminal 100. If the operational mode of the RRC layer of the terminal 100 is in idle state or RRC_IDLE, then the controller executes a step 211. If the operational mode of the RRC layer of the terminal 100 is connected or RRC_CONNECTED, then the controller executes a step 212.

In step 211, the RRC layer of the terminal 100, as those used for the LTE technology, has little time allocated for its controller to make a search for all the long-range networks available, such as 3GPP ($3^{rd}$ Generation Partnership Project) and WIMAX (Worldwide Interoperability for Microwave Access), or short-range networks available, such as WIFI (Wireless Fidelity) and Bluetooth.

In a step 213, the controller of the terminal 100 updates its local database 105 with all the networks detected in step 211, with their position, the absolute time, and the technology of the network. The position can in particular be given by the terminal, if Global Navigation Satellite Systems (GNSS) are available or, more commonly, via a position calculating system with the RSS (Receiving Signal Strength). It is also possible to deduce the position of the terminal by using the Time Difference Observed of Arrival (TDOA). Indeed, the terminal measures the time differences between the broadcast channels of the WMAN system on which it is connected. A broadcast channel is present per each cell in order to distribute the synchro and system information. Reporting these measurements to the WMAN network enables the position of the terminal to be determined.

As the RRC layer of the terminal 100 is in an RRC_IDLE mode, the controller of the terminal 100 has to update its local database 105 to be connected to the network.

In a step 215, the controller of the terminal 100 is able to autonomously carry out a reselection of a cell, if said terminal 100 finds a better network which, for example, requires less energy consumption, or if the terminal 100 is located close to a cell without leaving the RRC layer in an idle state.

In a step 212, the RRC layer of the terminal 100 is in a connected operational mode, RRC_CONNECTED, the controller of the terminal 100 sends data messages to the other terminals 100 belonging to a same user group.

In a step 214, the controller of the terminal 100 allocates a little time to carry out a search for potentially candidate networks.

In a step 216, the controller of the terminal 100 updates the MIIS server 110 via notifications of information relating to the availability of neighbouring networks that said controller has collected in the local database 105 of said terminal.

In a step 218, when a more suitable network has been detected because it guarantees, for example, a same quality of service for all the carriers and a lesser energy consumption, then the controller of the terminal 100 launches a Handover procedure initiated by the network, such as a switch from a 3GPP network to another 3GPP network, or directly initiated by the controller of the terminal 100, because of the presence of heterogeneous technologies.

In a step 220, when the battery 10 is half-charged or at a medium level 12, in other words, when the terminal 100 has a level higher than the low threshold 15, but lower than the high threshold 14, then the controller determines the operational mode of the RRC layer (not represented) of the terminal 100. If the operational mode of the RRC layer of the terminal is in idle state, RRC_IDLE, then the controller executes a step 221. If the operational mode of the RRC layer of the terminal is connected, RRC_CONNECTED, then the controller executes a step 222.

In a step 221, the controller of the terminal 100 carries out a search for all the long-range networks available, such as the 3GPP, WIMAX, etc. networks.

In a step 223, the controller of the terminal 100 carries out an update of the MIIS server 110, by sending notifications in its local database 105, as previously seen in step 213, but only by considering this reduced subset of detected networks.

In an optional step 225, the controller of the terminal 100 also carries out a cell reselection, if said terminal 100 deems it to be necessary.

In a step 222, the RRC layer of the terminal 100 is in a connected operational mode, RRC_CONNECTED, the controller of the terminal 100 sends data messages to all the terminals.

In a step 224, the controller of the terminal 100 determines all the long-range networks available, such as the 3GPP, WIMAX, etc. networks, in order to update the database server.

In an optional step 226, the controller of the terminal 100 also carries out a Handover procedure, if said terminal 100 deems it to be necessary.

Irrespective of their operational mode, for a medium level 12 of the battery 10, the controller of the terminal 100 is able to query the MIIS database 110 to obtain a state about whether short-range wireless networks located around said terminal 100 are present or not.

In a step 230, when the battery 10 is insufficiently charged or at a low level 13, in other words, when the terminal 100 has a lower level than the low threshold 13, the controller determines the operational mode of the RRC layer (not represented) of the terminal 100. If the operational mode of the RRC layer of the terminal is in idle state, RRC_IDLE, then the controller executes a step 231. If the operational mode of the RRC layer of the terminal is connected, RRC_CONNECTED, then the controller executes a step 232.

In a step 231, the controller of the terminal 100 does not carry out any search for neighbouring networks any longer, and determines whether the controller has carried out a cell reselection. If the controller has carried out a cell reselection, then the controller requires the MIIS server 110 in a step 233.

Thus, in a step 235, the controller sends the position of the terminal 100 to the base station to which it is connected, in order to determine which available networks are in the vicinity thereof.

In a step 237, the MIIS server 110 transmits a list of two or three most suitable networks to the controller of the terminal 100.

In a step 239, the controller of the terminal 100 determines whether it is possible to carry out a cell reselection procedure for one of the networks listed in step 237. If it is possible, then in a step 241, the controller of the terminal 100 carries out a reselection procedure. If it is not possible, then in a step 243, the controller of the terminal reiterates this reselection procedure with the remaining networks from the list. In a step 245, the controller determines whether no attempt has been successful with one of the networks from the list. If no attempt has been successful, then in a step 247, the controller of the terminal carries out itself a network scanning, in the same way as the one carried out if the battery were full.

In a step 232, the RRC layer of the terminal 100 is in a connected operational mode, RRC_CONNECTED, the controller 100 does not carry out any search for neighbouring networks any longer, and determines whether the controller has carried out a cell reselection.

In a step 234, if the controller of the terminal 100 has carried out a cell reselection, then the controller requires the MIIS server 110.

In a step 236, the controller of the terminal 100 sends data messages to the other terminals.

In a step 238, the controller requires the MIIS server 110 from the available networks in proximity to its position.

In a step 240, the MIIS database 110 transmits a list of two or three most suitable networks for the terminal 100 to be able to be connected thereto.

In a step 242, the controller of the terminal 100 determines whether it is possible to carry out a Handover procedure for one of the networks listed in step 240. If this is possible, then in a step 244, the controller of the terminal 100 carries out a Handover procedure. If this is not possible, then in a step 246, the controller of the terminal 100 reiterates this Handover procedure with the remaining networks from the list. In a step 248, the controller of the terminal 100 determines whether no attempt has been successful with one of the networks from the list. If no attempt has been successful with one of the networks from the list, then in a step 250, the controller of the terminal 100 directly carries out a network scanning, in the same way as that carried out if the battery were full. It is also possible for the Handover procedure to be launched before the transmission, for the terminal 100 to be able to be connected to the network with the most optimum energy efficiency possible, for the entire transmission, or during the transmission, if the environment has changed during the data transmission or data delivery in real time.

In this embodiment of the invention, as previously described, when the battery 10 of a terminal 100 is at a low level 13, the controller of said terminal 100 enables to carry out only essential activities, both for Handover/Vertical Handover requirements, or cell reselection, but still requiring the MIIS server 110. This MIIS server 110 is periodically updated, by the controller of a terminal 100 having the greatest watt-hour capacity. By means of the method according to the invention, a trade-off is made between all the terminals 100 of the private communication group, such that "a shared battery" is obtained, where the terminals 100 which have a higher level of battery, carry out tasks for all the terminals 100, whereas the terminals 100 having a battery 10 with a low level 13 take advantage of the tasks carried out by the terminals 100 having a battery 10 charged at a high level 11. All the terminals 100 have a battery 10 which switches from a fully charged state to a lowly charged state and as a matter of fact, sooner or later, each terminal 100 takes advantage of the tasks carried out by the other terminals 100.

The invention claimed is:

1. A method for establishing a strategy for saving energy of a battery of a mobile terminal belonging to a same user group, so as to allow a private and/or professional mobile radio used of said terminals, the method comprising, the method, for each terminal of said group, comprising
determining a state of charge of the battery:
when the battery is fully charged, determining an operational mode of a RRC (Radio Resource Control) layer of the terminal;
when the operational mode of the RRC layer of the terminal is in idle state, then:
carrying out a search for all the long-range, or short-range networks available;
when the operational mode of the RRC layer of the terminal is connected, then:
sending data messages to the other terminals belonging to the same user group;
updating a MIIS (Media Independent Information Services) server via notifications of information relating to the availability of neighbouring networks which is collected in a local database of said terminal;
when a more suitable network has been detected, launching a Handover procedure initiated either by the network, or directly by a controller of the terminal;
when the battery is half-charged, determining the operational mode of the RRC layer of the terminal:
when the operational mode of the RRC layer of the terminal is in idle state, then:
carrying out a search for all the long-range networks available;
when the operational mode of the RRC layer of the terminal is connected, then:
sending data messages to all the terminals;
determining all the long-range networks available in order to update a database server;
carrying out a Handover procedure if the terminal deems it to be necessary;
when the battery is insufficiently charged, determining the operational mode of the RRC layer of the terminal:
when the operational mode of the RRC layer of the terminal is in idle state, then:
determining whether a cell reselection has occurred;
when a cell reselection has occurred, requiring the MIIS server;
sending the position of the terminal to the base station to which it is connected, in order to determine which networks are available in the vicinity thereof;
determining whether it is possible to carry out a cell reselection procedure for one of the most suitable networks listed by the MIIS server:
when a cell reselection procedure can be carried out, carrying out the reselection procedure;
when a cell reselection procedure cannot be carried out, reiterating the reselection procedure with the most remaining suitable networks, which have been listed;
when no attempt for reselecting networks present in the list has been successful, carrying out a network scanning, similar to the one carried out when the battery is fully charged;
when the operational mode of the RRC layer of the terminal is connected, then:
no research for neighbouring networks is carried out any longer, and determining whether a cell reselection has been carried out:
when a cell reselection has been carried out, requiring the MIIS server;
sending data messages to the other terminals;
requiring the available networks in proximity of the position of the MIIS server from the latter;
determining whether it is possible to carry out a Handover procedure for one of the two or three most suitable networks, which have been listed by the MIIS database, for the terminal to be able to be connected thereto:
when a Handover procedure is possible, carrying out by the controller of the terminal a Handover procedure;
when a Handover procedure is not possible, reiterating by the controller of the terminal the Handover procedure with the remaining networks from the list;
when no Handover attempt has been successful with one of the networks from the list, directly carrying out by the controller of the terminal a network scanning.

2. The method according to claim 1, wherein when a search for all the long-range and/or short-range networks available is carried out, then an update of the local database of the terminal is carried out with all the networks detected during the search.

3. The method according to claim 1, wherein an update of the MIIS server is carried out, by sending notifications in the local database of the terminal.

4. The method according to claim 1, wherein the MIIS server is periodically updated by the terminal having the greatest watt-hour capacity in the group of terminals.

5. The method according to claim 1, wherein a cell reselection is carried out if the terminal deems it to be necessary.

6. The method according to claim 1, wherein a Handover procedure is carried out if the terminal deems it to be necessary.

7. The method according to claim 1, wherein when the battery is half-charged and irrespective of the operational mode, the controller of the terminal is able to query the MIIS database to obtain a state about whether short-range wireless networks located in the environment of said terminal are present or not.

8. The method according to claim 1, wherein the method is configured so as to enable a shared battery to be obtained, where the terminals which have a highest battery level, carry out tasks for all the terminals, whereas the terminals having a battery with a low level take advantage of the tasks carried out by the terminals having a battery charged at a high level.

9. A mobile terminal, configured so as to allow a private and/or professional radio use, able to implement a method according to claim 1.

* * * * *